United States Patent Office 3,413,687
Patented Dec. 3, 1968

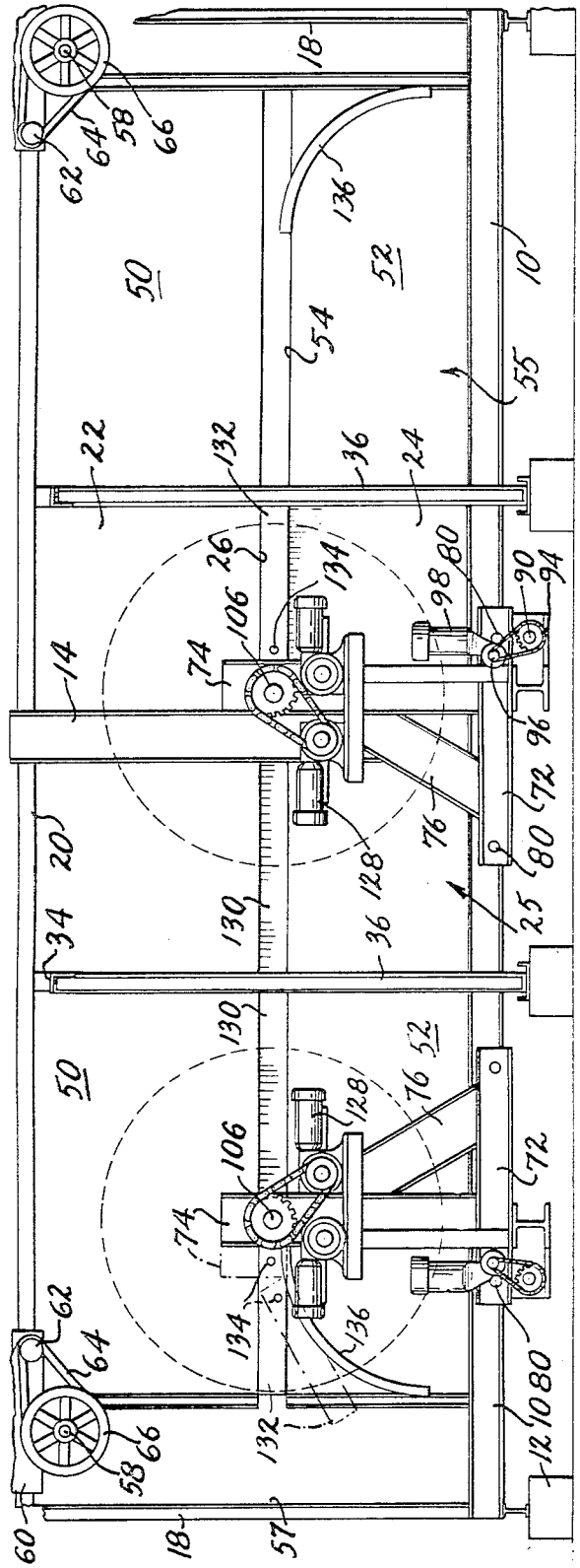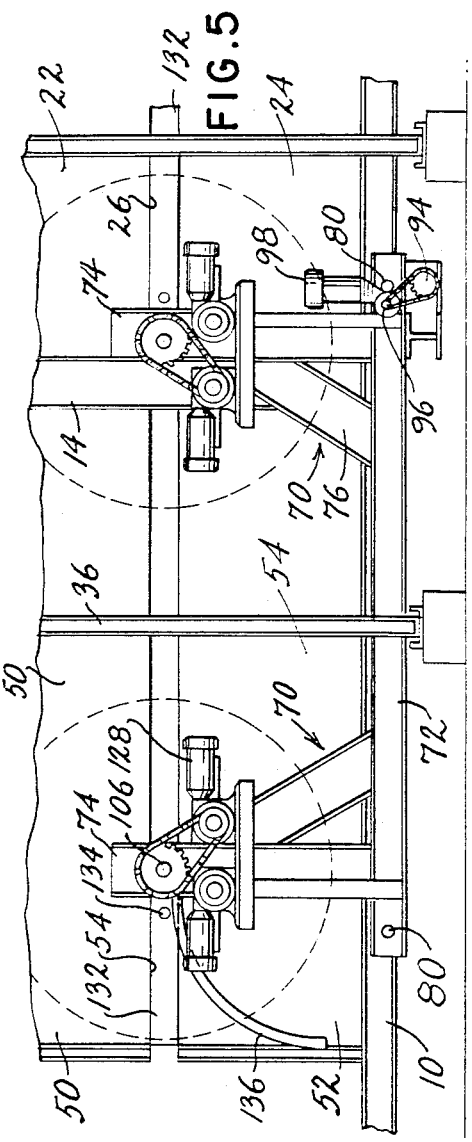

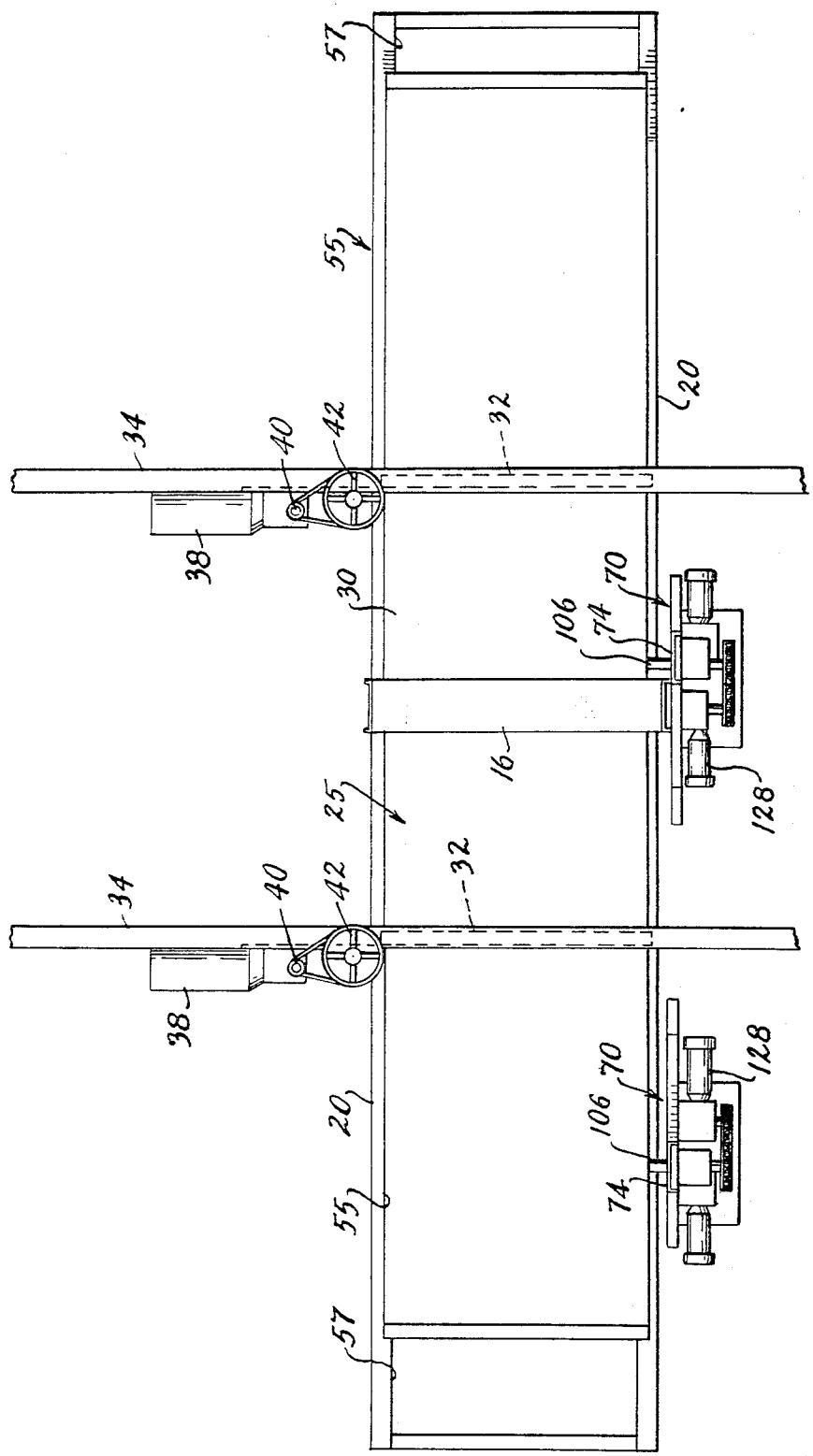

3,413,687
ROTATIONAL MOLDING APPARATUS FOR
THERMOPLASTIC ARTICLES
Elliott Bavers, New York, N.Y., assignor, by mesne assignments, to Rotodyne Manufacturing Corporation, Brooklyn, N.Y., a corporation of Delaware
Filed Mar. 6, 1967, Ser. No. 620,892
21 Claims. (Cl. 18—26)

ABSTRACT OF THE DISCLOSURE

Rotational molding apparatus in which a single curing chamber open at opposed ends and having an open-ended cooling compartment at each end elevated above a supporting surface, and having closures at each of its open ends, is provided with two mold-supporting structures each movable from one cooling compartment into the curing chamber. The mold-supporting structures each includes a rotatable mold-supporting shaft reciprocable in continuous horizontal slots provided in the side walls of the chamber and compartments; the shaft ends rotatably supported in uprights of a trolley consisting of interconnected trolley frames disposed on the exterior of the side walls of the apparatus and movably supported thereon.

---

The present invention relates to apparatus for the rotational molding of hollow synthetic plastic articles, such as of vinyl or the like, and is directed to the provision of such apparatus which will permit the substantial overlapping of molding cycles, to thereby make practically possible the speeding up of the molding operation.

The cycles of rotational molding include the steps of loading the molds with the liquid or low-melting powdered synthetic plastic material; closing and locking the molds; placing the molds in a curing oven or chamber where they are universally rotated; removal of the molds from the curing chamber and their cooling; the opening of the molds; and the removal of the molded articles therefrom, to leave the molds ready for the beginning of the succeeding cycle.

The present invention is directed to the provision of apparatus in which a single curing chamber may be utilized for the successive curing of two molds or mold groups; one of which curing may be cooled, unloaded and reloaded while the other is being held in the curing chamber.

It is an object of the present invention to provide apparatus, of the character described, which may be used for the molding of articles having identical curing periods in each of the two molds or mold groups, as well as for the molding of articles in one group of molds which have a different curing period from the articles in the other of the molds or mold groups.

It is another object of the present invention to provide apparatus, of the character described, which may mold articles in one mold or mold group that require different curing temperatures from the articles to be molded in the other of the molds or mold groups.

It is yet another object of the present invention to provide apparatus, of the character described, which is highly efficient in the utilization of heat.

It is a further object of the present invention to provide apparatus of the character described, that may be fully or partially automated, as may be desired.

It is still a further object of the present invention to provide apparatus, of the character described, which is compact, and sturdy; which is convenient to use; and which is highly efficient in its operation.

The foregoing and other objects and advantages of the rotational molding apparatus of the present invention will become more readily apparent to those skilled in the art from the embodiments thereof shown in the accompanying drawings and from the descriptions following:

It is to be understood, however, that such embodiments are shown by way of illustration only to make the principles and practice of the invention more readily understood and without intent of limiting the invention to the specific details therein shown.

In the drawings:

FIG. 1 is a more or less schematic side elevational view of one embodiment of the apparatus of the present invention, with one of the mold-supporting carriages shown as disposed in the curing chamber and the other in the cooling and loading compartment.

FIG. 2 is a top plan view of the same;

FIG. 5 is a fragmentary side, elevational view of the apparatus, showing a modified form of mold supporting carriage for the apparatus.

Figure 3:
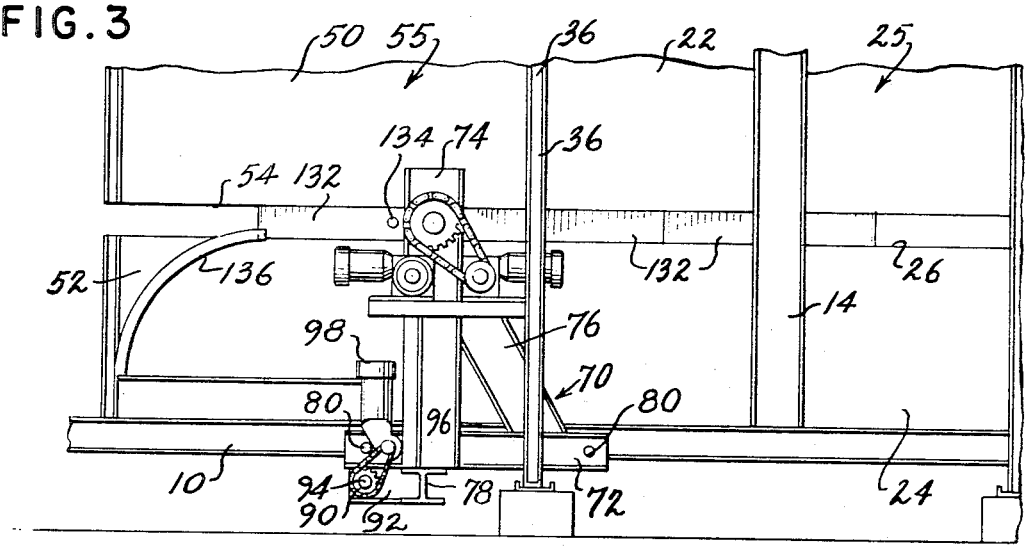
FIG. 3 is a fragmentary view showing the left-hand portion of the apparatus of FIG. 1, with a mold carriage in position on the way in or out of the curing chamber to or from the cooling and loading compartment.
Figure 4:
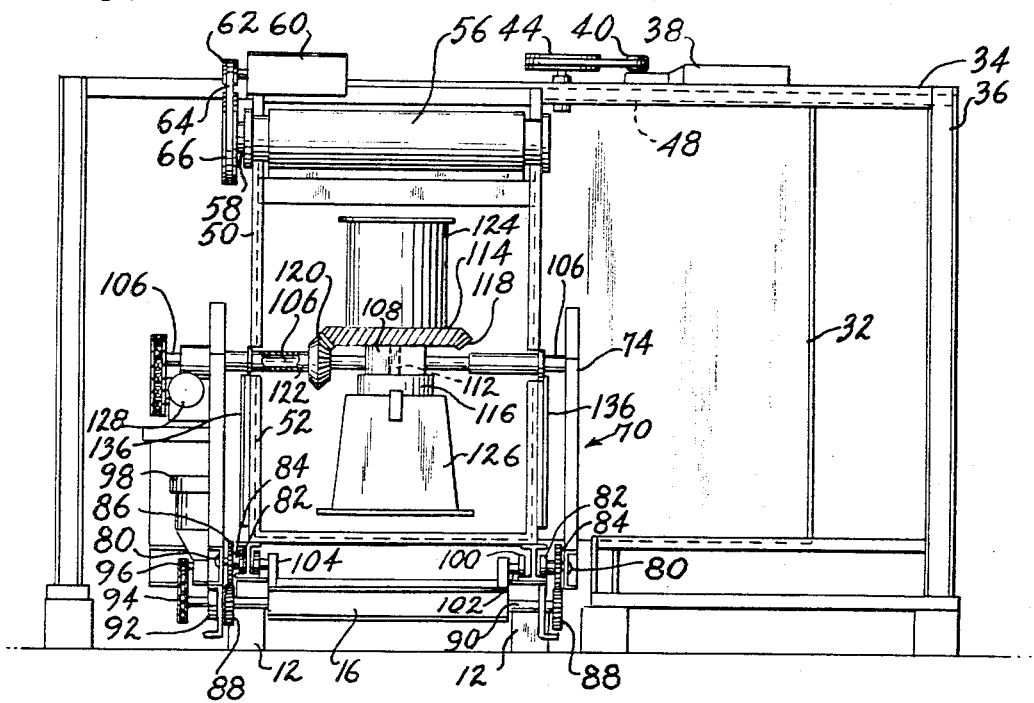
FIG. 4 is an end elevational view of the apparatus.

Referring now, in greater detail, to the embodiment of the invention illustrated in the drawings, the same is shown to comprise a pair of spaced, parallel, horizontally disposed elongated beams, 10, preferably H-beams, which are supported at their ends, by one of their sides, in elevated position above a supporting surface, as by the supports, 12, which may be of any suitable type, as of concrete or metal, or a combination of both, as illustrated. The horizontal beams 10 may each support, at its center, an upright beam 14, which beams may be interconnected at their upper ends by a cross-beam, 16. The beams 10 may also support at their ends uprights, 18, whose upper ends support a horizontal bar 20, to thereby create a rectangular wall frame on each of the beams 10.

The beams 14 each supports, preferably on its inner surface, a pair of spaced upright upper and lower wall sections, 22 and 24, respectively, which are separated by the horizontal guideway gap, 26. Wall setcions 22 and 24 are supported on beams 14 at their longitudinal center, with the gap 26 between them substantially mid-way of the height of the wall frame, and terminate a substantial distance short of the ends of beams 10.

Wall sections 22 and 24 define the side walls of a curing chamber, generally designated as 25, which is completed by a bottom wall of floor, 28, and a top wall, or ceiling, 30; with the opposed ends of the chamber being open and closable by doors, 32. Each door 32 is movably supported by its upper end, in any desired manner, for movement into and out of chamber closing position as on a transverse rail, 34, extending across the width of the curing chamber 25 and extending at least on one side of the chamber a distance not less than the width of a door, 32. The ends of the rails 34 may each be supported by posts, 36, to provide a firm structure.

Doors 32 may be, preferably, mechanically movable, as by a reversible motor, 38, mounted on rail 34, whose shaft mounts a pulley wheel or sprocket, 40, operatively connected to the larger wheel, 44 journalled on rail 34, whose shaft carries a pinion, 46 that may engage a rack, 48 carried on an upper edge portion of the door 32.

The door 32 may also be supported at its bottom as on rail 49. It may here be stated that wall sections 22 and 24, bottom wall 26, top wall 28, and doors 32 may be of heat insulating construction.

Supported on each bar 20, to each side of upper wall section 22, and spaced therefrom a distance to admit between them the thickness of a door 32, is a wall section 59, of a height equal substantially to the height of wall section 22, and substantially equal in length thereto. A lower wall section 52, equal substantially to in height and width to wall section 24, is supported, as on beam 10, below wall section 50; wall sections 50 and 52 being separated by guideway gaps 54, alined with guideway gaps 26. Wall sections 50 and 52, which need not be insulated define the side walls of a mold cooling compartment, 55, which is completed by a roof section which may be an extension of curing chamber roof 30.

Wall sections 50 and 52 may terminate short of the ends of beams 10, to provide a working area, 57, for more loading and unloading.

It will be understood that suitable heating means may be provided in the curing chamber; the former of which may be in the form of ducts opening into the curing chamber through which electrically or otherwise heated air may be blown there into and that conventional means for venting of the heated air may likewise be provided in the curing chamber as well as in the cooling compartments. It may here also be stated that means for admitting cooling fluid into the cooling compartment may be provided, as in the form of water sprays; all in a manner that is conventional and will be readily apparent to those skilled in the art and not thought necessary to be illustrated in detail.

Means may be provided for preventing the sprayed cooling fluid from escaping from the open ends of the cooling compartments, 55. In the illustrated embodiment such means is shown to comprise a rolled-up screen, 56, supported on a roller, 58, at the top of each cooling compartment at its outer end, for rolling up and down to close the open end thereof. Mechanical means may be provided for operating the roller screen which may comprise reversible motor 60 having the sprocket or pulley wheel 62 at the end of its shaft, which is connected by belt or sprocket chain 64, to a second pulley or sprocket wheel, 66, which is mounted on the roller 58 of the screen 56.

The apparatus includes means for successively or selectively moving a pair of mold-supporting members into and out of the curing chamber 25, out of and into each of the cooling compartments 55 through the open end of the curing chamber adjacent to the cooling compartment. Such mold-moving means may comprise a pair or carriage or trolleys, each generally designated as 70, and each comprising a pair of frame members which are each movably supported, preferably on the exterior of the side walls of the apparatus, preferably on one of the beams 10. Each frame member may comprise a horizontally disposed beam or bar, 72, which may be of U-shape and disposed with its web in upright position and its sides outwardly directed and upright post 74, mounted on each beam 72, preferably adjacent to outer end.

The beam 72 and upright 74 may be braced, as by diagonal brace member 76. The two beams 72 of each trolley 70 are connected by the cross-tie, 78, which extends below beams 10. Beam 72 are each provided with pins, 80, extending inwardly from their webs adjacent each end thereof. Pins 80 mount wheels, 82, that rest on the lower outer flange of the adjacent H-beam 10. One of the wheels 82 may be provided with an outwardly-extending bearing or sleeve, 84, mounting integrally or otherwise, the pinion, 86, which meshes with a driving pinion, 88, mounted on the adjacent end of a shaft, 90, which is journaled in parallel plates, 92, extending outwardly from each end of the cross-tie, 78. The shaft 90 carries on one projecting end a pulley or sprocket wheel, 94, which is operatively connected to a pulley or sprocket, 96, mounted at the end of the shaft of a motor, 98, which is secured on the adjacent trolley frame member.

Additional wheels, 100, may be provided on that trolley, 70, to ride on the inner lower flange of the H-beam 10. Such wheels may be mounted on pins 102, set into upright bars, 104, rising from the cross-tie, 78.

Uprights 74 extend to a height above the gaps between the upper and lower side sections of the side walls of the curing chamber and cooling compartment and have journaled in them, at a point opposite such guideway gaps, the ends of a shaft, 106, which is disposed in said gaps. Each shaft 106 is preferably formed of two parts whose inner ends are fixedly set into a block, 108. Block 108 may have a bearing opening, 110, formed therethrough, extending in a direction normal to the axis of shaft 106, in which is journaled a pin, 112, connecting two mold-supporting member or plates, 114 and 116, respectively, one of which, as 114, is circular and overlaps the block 108 and is provided on the corner of its underside, with beveled gear teeth, 118, that mesh with the beveled pinion, 120, mounted at the end of a sleeve, 122, that is secured on the shaft 106. Each member 114 and 116 may support an individual mold, such as 124 and 126, respectively, as illustrated, which may differ in shape and size and form from one another, as shown, or may support a base plate mounting a plurality of molds in a manner that is conventional and will be readily understood and not thought necessary to be specifically illustrated or described.

Shaft 106 may be mechanically rotated, as by motor 128, mounted on one of the trolley frame members, whose drive shaft is operatively connected to shaft 106, to rotate it, to thereby rotate the mold-supporting members 114 and 116 around both vertical and horizontal axes, as will be readily understood by those skilled in the art.

It will be readily understood that, in operation, doors 32 of curing chamber 25 may be opened and the motors of the two trolleys 70 activated to move one of the trolleys from a first curing compartment 55 into the curing chamber 25 and simultaneously move the other trolley from the curing chamber 25 to the opposed second cooling compartment 55. Shaft 106 of the first trolley will move through guideway gap 54, between the side wall sections of the first cooling compartment 55 into guideway gap 26 between the side wall sections of the curing chamber, and shaft 106 of the second trolley move from guideway gap 26, between the side wall sections of the curing chamber into the guideway gap 54 of the second of the cooling compartments. Doors 32 may then be closed again and the rolled-up screen 56, of the second cooling compartment lowered and a spray started to cool the molds disposed therein. The screen 56 may there be raised and the trolley moved into the loading and unloading area 57 for the unloading and reloading of the molds. During this cooling, unloading and loading, the molds on the trolley 70, disposed within the curing chamber 25, are rotated, to shape and cure the articles in such molds. When the curing period is completed, the cycle is repeated by opening doors 32, moving the molds of the second trolley out of the curing chamber, and moving the reloaded molds on the first trolley into the curing chamber and reclosing the doors.

Means may be provided for keeping the guideway gaps 26 and 54 closed, to prevent escape of heat from the curing chamber and the cooling spray from the cooling compartment.

Such means may comprise a pair of baffles 130, freely slidably positioned in each gap 26 each of a length equal substantially to half the length of the gap, with its outwardly facing end engageable by the shaft 106 of a trolley moving into chamber 25. Each of the trolleys 70 also has a baffle 132, of substantially equal length with a baffle 130, secured, thereto at each side, slidably movable into and out of a gap 26, out of and into the alined gap 54. By this arrangement, when either of trolleys 70 is moved to chamber 25, to position the molds it supports on the center of the chamber for rotation therein its shaft 106, will engage and move the adjacent baffles 130 into the half of the gaps 26, remote from the end through which the molds enter the chamber; the remote baffle 130, being pushed into the inner half of the adjacent gap 54, while its connected baffles 132 are pulled into the half of gaps 26 behind shaft 106; at the same time the other trolley moving into its adjacent compartment 55, will fill the outer half of the gap 54 of such compartment, to prevent dispersal of the cooling fluid through such gap 54.

In order to keep baffles 132 out of the way of an operator working to load and unload the molds, when the trolley 70 is moved into the working area at each end of the apparatus, each baffle 132 may be pivotally supported on the trolley 70, as at 134, and guided on the exterior of the compartment side wall, as on the upper end of an outwardly and downwardly curved guide rail 136, mounted on the outer end of wall section 52, in position that when a pivot 134 passes the center of a gap 54, the baffle 132 will ride down on rail 136, and will not project into or alongside of the working space.

It will be readily apparent that the apparatus of the present invention may be automated to various degrees by connecting the several motors in suitable desired circuits that may be controlled in desired sequence by a switch, such as normally open microswitch 138, mounted on one of the rails 10, and adapted to be closed by the adjacent trolley 70 as it is moved into position to bring its molds within the curing chamber 25. Such switch, for instance may shut off the trolley motor circuits; may close the circuit through the door-moving motors 38 to close the doors and simultaneously close a circuit to activate the means for heating the curing chamber 25. It will be readily apparent that by such arrangement it is possible to set the apparatus to supply different degrees of heat within the curing chamber for the two trolleys 70. It will also be apparent that each circuit may have its individual timer for setting the duration of the curing period for the molds of the trolley which closes it.

As such circuit arrangement for performing the foregoing functions and other arrangements for performing automatic functions on the apparatus, such as the activation of the trolley-moving motors and the spray curtain motors may be readily devised by any electrician skilled in the art, it is not thought necessary to illustrate or disclose the same in detail.

In FIG. 5, there is shown a modified mold-moving system for the apparatus in which the two trolleys are interconnected into a unit whereby they are simultaneously movable. Such modified trolley system may be used in cases where, for instance, the curing period is not less than the time required for cooling and loading and unloading of the apparatus and makes possible a completely automated operation of the apparatus, except for the loading and unloading of the molds.

This completes the description of the apparatus of the present invention. It will be readily apparent that the apparatus of the present invention may speed molding operation in a number of ways; by the provision of two mold-supporting structures that utilize the same curing chamber whereby their molding cycles may be overlapped; by providing the mold trolleys with a capacity of each to support two molds or mold groups, and by the capacity of the apparatus to be substantially automated. It will also be apparent that the apparatus of the present invention is relatively compact and may occupy a minimum of floor space in relation to its productive capacity. It will likewise be apparent that the apparatus of the present invention may be economically operated with a minimum number of attending operators.

It will be further apparent that numerous variations and modifications may be made in the apparatus of the present invention by anyone skilled in the art in accordance with the principles of the invention set forth above and without the exercise of any inventive ingenuity. I desire, therefore, the protection of the patent laws for any and all and variations and modifications that may be made within the spirit of the invention and the scope of the claims hereto appended.

What I claim is:

1. Apparatus for rotational molding of thermoplastic material, comprising a curing chamber including spaced side walls and having at least one open end, each said side wall having a guide slot formed therein intermediate its upper and lower edges; a re-openable closure for said open end of said chamber, means for supporting and moving a mold into and out of said curing chamber through said open end, including a mold-supporting shaft and movable means rotationally supporting said shaft for reciprocating movement within said slot into and out of said chamber; means for rotating said shaft and means slidable within said slot for closing said slot when said shaft is moved into said chamber.

2. The apparatus of claim 1, wherein said chamber is formed with its other end open and said guide slots extend across said side walls, a re-openable closure is provided at said other open chamber end, and a second mold-moving means is provided for moving a mold into and out of said chamber through said other open end thereof.

3. The apparatus of claim 2, wherein a cooling compartment is provided at each said open end of said curing chamber, each said cooling compartment including spaced side walls in substantial alignment with said walls of said curing chamber, each said cooling compartment side walls having a guide slot formed therein in alignment with said guide slots of said walls of said curing chamber, said shaft and shaft-supporting means movable to reciprocate said shaft into and out of said slots in said cooling compartment side walls.

4. The apparatus of claim 2, wherein said curing chamber closure means comprise doors movable laterally across said open ends of said curing chamber, and means are provided for supporting each said door for movement into and out of closing position, and wherein the edges of said compartment side walls are spaced from the adjacent edges of said chamber side walls a distance to admit one of said doors.

5. The apparatus of claim 3, wherein movable means are provided for closing the open end of each said compartment.

6. The apparatus of claim 1, wherein said curing chamber is mounted on a base frame, said frame including a pair of beams, each one underlying an edge one of said side walls, said beams supported at their ends in spaced relation to a supporting surface, and wherein said movable means supporting said shaft comprises a pair of frame members, each including a horizontal bar movably supported on each said beams externally of the side wall above it, a tie bar rigidly connecting said horizontal bars to one another below said base frame beams, and an upright bar supported on each said horizontal bars, said mold-supporting shaft rotatably journaled in said upright bars.

7. The apparatus of claim 6, wherein an electric motor is mounted on one of said frame members of said shaft-supporting means, and means are provided for operatively inter-engaging said motor with said shaft for rotation of said shaft by said motor.

8. The apparatus of claim 2, wherein said curing chamber is mounted on a base frame, said frame projecting at each end beyond said curing chamber and including a pair of beams, each one underlying an edge of one of said side walls, said beams supported at their ends in spaced relation to a supporting surface and wherein each said movable means supporting a mold-supporting shaft comprises a trolley comprising a pair of spaced frame members each including a horizontal bar movably supported on one of said beams externally of the side wall above it, a tie bar rigidly connecting said horizontal bars to one another below said base frame beams, and an upright bar supported on each said horizontal bar, said mold-supporting shafts rotatably journaled in said upright bars.

9. The apparatus of claim 8, wherein an electric motor is mounted on one of said frame members, and means are provided for operatively inter-engaging said motor with the shaft journaled in the upright bars of said trolley frame members for rotation of said shaft by said motor.

10. The apparatus of claim 6, wherein said frame beams are of H-cross-section and disposed on a side, and wherein each said horizontal bar is provided with a least one wheel rotatably supported thereon, said wheel rotatably supported on the lower, outer flange of said frame beam.

11. The apparatus of claim 10, wherein a shaft parallel to said tie-bar is rotatably supported on said tie-bar, and said wheel and said shaft are operatively inter-engaged for rotation, and wherein electric motor means is mounted on one of said frame members of a trolley and is operatively connected to said tie-bar-supported shaft for rotating the same.

12. The apparatus of claim 3, wherein said curing chamber and said cooling compartments are mounted on a base frame, said frame including a pair of beams, each one underlying an edge of one of said walls of each said curing chamber and each said cooling compartment, said beams supported at their ends in spaced relation to a supporting surface, and wherein each said movable means supporting a mold-supporting shaft comprise a trolley comprising a pair of spaced frame members each including a horizontally-disposed bar movably supported on one of said beams externally of the side wall above it, a tie-bar rigidly connecting said horizontal bars to one another below said base frame beams and an upright bar supported on each horizontal bar, said mold-supporting shaft rotatably journaled in the upright bars of one of said trolleys.

13. The apparatus of claim 12, wherein an electric motor is mounted on one of said frame members of each said trolleys, and means are provided for operatively inter-engaging said motor with a shaft journaled in the upright bars of said frame members for rotation of said shaft by said motor.

14. The apparatus of claim 13, wherein said frame beams are of H-cross-section and disposed on a side, and wherein each horizontal bar of each said frame member is provided with at least one wheel rotatably supported thereon, said wheel resting on the lower, outer flange of the adjacent base frame beam.

15. The apparatus of claim 14, wherein a shaft parallel to said tie-bar is rotatably supported on said tie-bar and said wheel and said shaft are operatively inter-engaged for rotation, and wherein electric motor means is mounted on one of said frame members of a trolley operatively connected to said tie-bar-supported shaft.

16. The apparatus of claim 12, wherein means are provided for closing said slot between said sections of said side walls of said curing chamber and engageable by a mold-supporting shaft moved into said slot for movement of the baffle contacted thereby to an end of said slot and the other of said baffles into the slot of the adjacent side wall of the cooling compartment to the other side of said contacted baffle.

17. The apparatus of claim 16, wherein a baffle is secured to each frame member of each said trolley in position to close a portion of the slot in the side wall of the cooling compartment into which said mold-supporting shaft is movable.

18. The apparatus of claim 17, wherein each of said trolley-supported baffles is pivotally supported adjacent its end on its supporting frame member exteriorly of the adjacent cooling compartment side wall, and means are provided on the upper, outer end portion of the lower section of said wall for supporting and guiding said pivoted baffle as its pivoting point is moved past the longitudinal center of the slot in the adjacent cooling compartment side wall.

19. The apparatus of claim 2, including a pair of horizontally-disposed rails each parallel to and adjacent one of said side walls, and wherein each said movable means supporting one of said shafts comprises a carriage, said carriage including a pair of spaced frame members and means rigidly interconnecting said frame members with one another, said carriage movably supported on said rails with the frame members thereof disposed each on the exterior of one of said side walls and overlapping the slot of the wall adjacent thereof, each of said shafts rotatably journalled in the frame members of a carriage and means for reciprocably moving said carriages on said rails.

20. The apparatus of claim 19, wherein means for zontally-disposed rails each parallel to and adjacent member of the carriage supporting said shaft, and means connecting said shaft with said motor for rotation thereby.

21. The apparatus of claim 19, wherein the means for reciprocably moving the carriage on said rails includes a motor mounted on one of the frame members of said carriage.

References Cited

UNITED STATES PATENTS

| | | |
|---|---|---|
| 1,603,015 | 10/1926 | Beasley et al. |
| 2,272,966 | 2/1942 | Dany. |
| 2,526,461 | 10/1950 | Dirdin. |
| 2,681,472 | 6/1954 | Remple. |
| 2,743,479 | 5/1956 | Rhee et al. |
| 3,141,193 | 7/1964 | Slemmons. |
| 3,237,247 | 1/1966 | Eggert et al. |
| 3,315,314 | 4/1967 | Barnett et al. |

WILLIAM J. STEPHENSON, *Primary Examiner.*